Patented Jan. 3, 1950

2,493,629

UNITED STATES PATENT OFFICE 2,493,629

PROCESS OF PREPARING A HYDRATED FERROUS CHLORIDE IN DRY FLAKE FORM

Ashland S. Henderson, West Orange, N. J., and Edward A. Beidler, Columbus, Ohio, assignors, by mesne assignments, to Henry L. Crowley & Company, Inc., a corporation of New Jersey No Drawing. Application November 3, 1944, Serial No. 561,838

1 Claim. (Cl. 23—87)

This invention relates to the production of metal chlorides which essentially do not melt at temperatures below their respective decomposition points. It is primarily concerned with the production of ferrous chloride, nickelous chloride, and cobaltous chloride having a controlled content of chemically combined water closely approximating two moles of water per mole of metal chloride. By the method of our invention, the formation of metal oxide and of metal(ic) chlorides may be substantially prevented, and a product composed essentially of the desired metal(ous) chloride dihydrate may be obtained.

By means of our invention, the metal chloride is obtained in the form of thin flakes having sufficient chemical stability to permit handling in air without excessive decomposition. The character of these flakes is of particular importance, inasmuch as they may be readily briquetted to form briquettes having a high density, good strength, and the ability to retain their shape on heating at temperatures below the melting point of the respective metal chlorides. These characteristics are of fundamental importance in the use of metal chlorides which may be used to form metal chloride briquettes in the preparation of metal powders.

Although many methods have been proposed for the production of the various hydrated metal chlorides, none of the processes are adaptable for the production of metal chlorides having the physical characteristics and the content of chemically combined water desired for use in the production of metal powders by hydrogen reduction. Furthermore, the processes previously proposed are relatively expensive and relatively difficult to perform on a large scale.

For example, Prutton, in U. S. Patent No. 1,938,461, has suggested a method for the production of ferrous chloride dihydrate. In this method, a solution of ferrous chloride is evaporated, crystallized, and filtered at a temperature above the decomposition temperature of the ferrous chloride tetrahydrate. Although the crystals obtained by this process are essentially ferrous chloride dihydrate, it is practically impossible to avoid the retension of occluded water from the mother liquor, and the resultant product generally contains water approximately equivalent to three moles of water per mole of ferrous chloride. Furthermore, the crystals produced in this manner are not particularly well suited for briquetting, inasmuch as they do not flow well under the briquetting pressure and the resulting briquette possesses little or no strength. In addition, ferrous chloride produced by this process usually contains up to 0.5 per cent of ferric chloride and up to 0.5 per cent of iron oxide.

British Patent No. 100,517 (1916), suggests the application of the spray drying technique to produce essentially anhydrous ferrous chloride from pickle liquor. Although such a process may be adapted to the production of the dihydrate, the product is a very fine powder which hydrolizes readily to the ferric condition; consequently, it is difficult to handle the material in air without the formation of excessive amounts of the ferric salts. In addition, the product of the spray drying operation is so fine and of such low apparent density that it cannot be handled properly in the briquetting operation.

A primary object of our invention is, therefore, to provide a method for the production of a hydrated metal chloride salt which does not melt below the decomposition temperature of the hydrates.

Another object is the manufacture of a hydrated metal(ous) chloride which is substantially free from oxide and from metal(ic) chloride.

A further object is to provide a method for the production of a hydrated metal chloride that can be handled in air without injurious decomposition.

Still a further object of our invention is to provide a method of controlling the water content of a hydrated metal chloride.

Still another object is to provide a hydrated metal chloride which possesses the proper physical characteristics to be adapted to a briquetting process.

Yet another object of this invention is to provide a method of producing particles of a hydrated metal chloride which will retain their shape on heating at a temperature below the melting point of the respective chloride.

Again, it is an object of this invention to provide ferrous chloride, nickelous chloride, and cobaltous chloride containing approximately two moles of chemically combined water per mole of chloride.

Other and further objects of this invention will be apparent from the following detailed disclosure and as pointed out in the appended claims.

This invention consists substantially in the novel process for the production of hydrated metal chloride to be described, all as will be more fully hereinafter set forth and pointed out in the appended claim.

Before explaining in detail the present invention, it is to be understood that the invention is capable of being practiced or carried out in various ways, it being also understood that the phraseology or terminology employed herein is for the purpose of description and not of limitation, and it is not intended to limit the invention herein claimed beyond the requirements of the prior art.

For the purposes of illustration, this invention will be described primarily in relation to its use in the production of ferrous chloride dihydrate; however, it is to be understood that the process is adaptable with only minor changes to the production of other hydrated metal chlorides, such as the hydrates of nickelous chloride and cobaltous chloride.

In accordance with this invention, we have discovered that it is possible to produce a flaky hydrated metal chloride having a water content approximating the dihydrate, for example, from 1.8 to 2.4 moles of chemically combined water per mole of metal chloride, by drying a solution of the chloride on a heated metal surface, for example, a surface heated at a temperature in excess of 212° F. and below the decomposition temperature of the hydrated metal chloride. In general, we have found the range of from 212° to 350° F. quite applicable; however, for best commercial operating conditions and to produce the optimum physical structure in the product, we prefer to operate in the temperature range of from 225° to 300° F. In general, we have found that the strength of the metal chloride solution is not too critical; however, for economic reasons we have found it desirable to use a strength between 10 per cent, by weight, and saturation; and we prefer to use a solution containing from 25 to 50 per cent, by weight, of the metal chloride. In commercial operation where continuous production is possible, the drying step may be adequately carried out on a drum drier. The dried metal chloride dihydrate is removed from the hot surface as dense stable flakes, particularly adapted to briquetting.

We have found that pure, white ferrous chloride dihydrate containing less than 0.1 per cent of ferric chloride and less than 0.1 per cent of iron oxide can be produced when a solution of ferrous chloride is dried on a commercial drum drier with the heating being accomplished with 50 pounds per square inch pressure of steam on the interior surfaces of the rotating drums. Although material of the same satisfactory characteristics can be produced on heated flat plates, we have found that there is a slight tendency for the product to oxidize slowly at elevated temperature; therefore, it should be removed from the plate soon after it has dried. In the drum drier, this operation is accomplished automatically, and hand labor is, therefore, essentially eliminated.

By controlling the chemically combined water in the hydrate, we are able to produce material particularly well adapted for subsequent briquetting. When the water of composition is suitably controlled so that it is essentially between 1.8 and 2.4 moles of water per mole of metal chloride, the process herein disclosed produces flakes that do not dust excessively and that are stable and do not show a strong tendency for hydrolysis when stored or handled in the air. Furthermore, these flakes flow well at low briquetting pressures and produce briquettes of considerable strength.

Although many metal chloride solutions contain some hydrochloric acid, we have found that the presence of this material is not particularly objectionable as long as its concentration is kept relatively low, for example, below 0.5 per cent by weight. In fact, the presence of a small amount of hydrochloric acid may actually be beneficial, inasmuch as we have found that its presence tends to minimize oxidation of the product.

As a specific example of our process, we have operated a commercial double drum drier having two 28-inch drums, 60 inches long, to produce 300 pounds of ferrous chloride per hour containing 2.2 moles of chemically combined water per mole of ferrous chloride from a solution containing 35 per cent, by weight, of ferrous chloride. The resulting ferrous chloride dihydrate was white in color and contained less than 0.1 per cent of ferric chloride and less than 0.05 per cent of iron oxide.

This material produced briquettes which had adequate strength for handling and which did not lose their shape when heated at temperatures below the melting point of ferrous chloride. The density of the briquettes could be varied by varying the forming pressure. For example, a briquette pressed at 4,300 pounds per square inch had a density of 0.046 pound per cubic inch, while a pressure of 6,600 pounds per square inch produced a briquette having a density of 0.07 pound per cubic inch. The briquettes retained their shape on heating at temperatures below the melting point of ferrous chloride.

As another specific example of our process, we have operated a single rotary drum drier, having a 21-inch face and a 24-inch diameter, to produce ferrous chloride having essentially two moles of chemically combined water per mole of ferrous chloride. In operation, the drum was immersed to a depth of 1 inch in a solution containing 35 per cent, by weight, of ferrous chloride and a small amount of hydrochloric acid. When operating at 5 R. P. M. with a steam pressure of 45 pounds gauge, 3¼ pounds of the hydrated ferrous chloride was produced per hour per square foot of total drum surface. The product was composed of fine white flakes containing some small crystal-like masses which briquetted readily and had adequate stability in regard to oxidation when handled in the air.

This, we believe, constitutes a new and novel process for producing metal chloride dihydrate, especially ferrous chloride dihydrate, nickelous chloride dihydrate, and cobaltous chloride dihydrate, having properties particularly well suited for the production of briquettes.

Although our invention has been described primarily with reference to its use in connection with ferrous chloride, it will be readily apparent to one skilled in the art that the principles of the invention can readily be adapted for use in connection with other metal chlorides such as nickelous chloride and cobaltous chloride.

It will also be understood that our invention is not intended to be limited to the particular details set forth as illustrations. Indeed, possible variations have been suggested in this disclosure as examples of how the basic features may be varied by those skilled in the art without departure from the spirit of the invention.

What we claim is:

The process of preparing a hydrated ferrous chloride in dry flake form, consisting of the steps of preparing an aqueous solution consisting essentially of ferrous chloride having a concentration of $FeCl_2$ of about 25% to about 50% by weight, disposing said solution as a film on a surface heated to a temperature in the range of 225° F. to about 300° F. and thereby evaporating said solution substantially to dryness to leave on said surface a dry hydrated ferrous chloride having from about 1.8 to about 2.4 mols of water of hydration per mol of ferrous chloride, and mechanically removing said hydrated ferrous chloride from said surface as dry flakes.

ASHLAND S. HENDERSON.
EDWARD A. BEIDLER.

REFERENCES CITED

The following references are of record in the file of this patent:

UNITED STATES PATENTS

| Number | Name | Date |
|---|---|---|
| 1,938,461 | Prutton | Dec. 5, 1933 |
| 2,284,861 | Farber | June 2, 1942 |

OTHER REFERENCES

Perry, "Chem. Engr's Handbook," second ed., 1941, pp. 1498–1499.

Mellor, "Comprehensive Treatise on Inorganic and Theoretical Chem.," vol. 14, 1935, page 13.